(No Model.)

F. W. LANCHESTER.
STEERING MECHANISM FOR POWER PROPELLED VEHICLES.

No. 593,357. Patented Nov. 9, 1897.

Witnesses:
J. B. Bolton

Inventor:
Frederick William Lanchester
By Richard K
his Attorneys.

UNITED STATES PATENT OFFICE.

FREDERICK WILLIAM LANCHESTER, OF ALVECHURCH, ENGLAND.

STEERING MECHANISM FOR POWER-PROPELLED VEHICLES.

SPECIFICATION forming part of Letters Patent No. 593,357, dated November 9, 1897.

Application filed March 12, 1897. Serial No. 627,180. (No model.)

*To all whom it may concern:*

Be it known that I, FREDERICK WILLIAM LANCHESTER, engineer, a citizen of Great Britain, residing at Cobley Hill, near Alvechurch, in the county of Worcester, England, have invented certain new and useful Improvements in the Steering Mechanism of Power-Propelled Vehicles, of which the following is a specification.

This invention relates to improvements in controlling and steering mechanism of power-propelled vehicles, and has for its object to provide a steering mechanism by which the steering-wheels mounted upon independent "heads" may receive a more truly radial motion than heretofore, and, further, to provide a means of operating the said steering mechanism in an improved manner, so that the vehicle shall be better under the control of the driver.

Referring to the accompanying sheet of drawings, Figures 1, 2, 3, 4, and 5 deal with my steering devices. Fig. 1 is a plan showing the arrangment of steering-wheels and links. Fig. 2 is a diagrammatic plan showing the effect of the linkage in producing a greater angular movement on the wheel at the inside of the curve. Fig. 3 is a plan of one steering-wheel, showing one arrangement of linkage. Fig. 4 is an elevation, and Fig. 5 a plan, of a new arrangement of steering-tiller.

In one mode of constructing a steering-gear in accordance with the present invention as applied to a four-wheeled vehicle, I arrange one pair of wheels to turn about independent pivots. (See Figs. 1, 2, and 3.) In one arrangement the bearing H' of each steering-wheel H is formed on one limb of an L-pin, the other limb of which fits into a socket I in the frame. Projecting from the elbow of such L-pin and at right angles to both limbs thereof a guiding-pin J is provided, which is acted on by a sliding block K, swiveling on the end of a lever L, whose fulcrum-pin L' is parallel to but a good bit out of line with the steering-socket I. These two levers L (one each side) are coupled by links M to move through equal angles and the necessary inequality is introduced in the motions of the steering-wheels by the proper relative placing of the L-pin sockets I and the lever-fulcrum pins L'.

Figure 1:
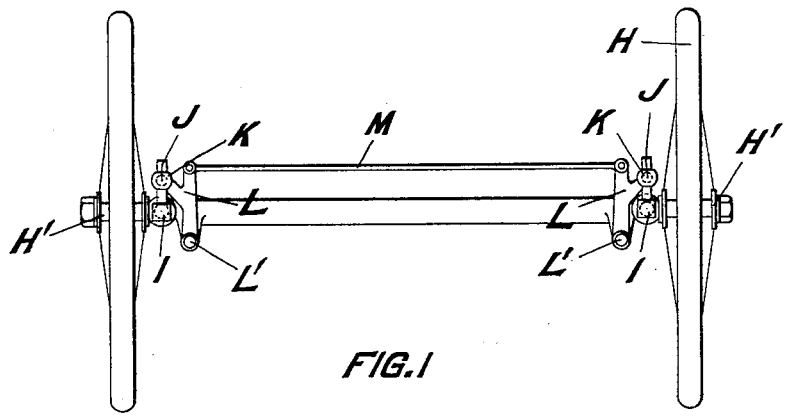
Figure 2:
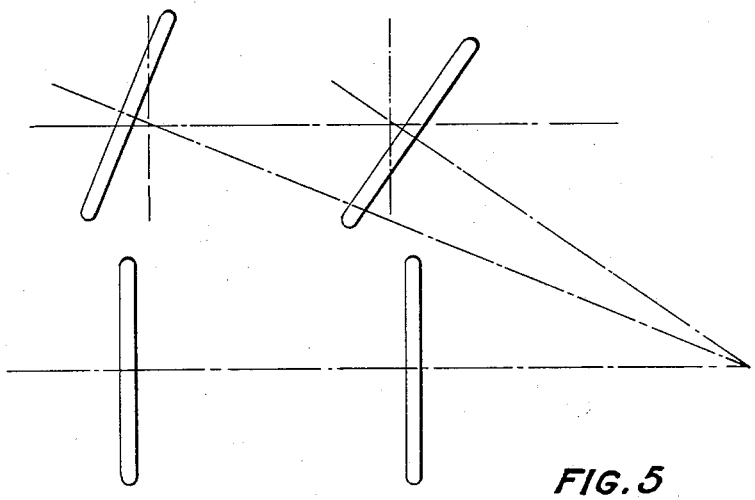
Fig. 2 shows the effect of the arrangement on the relative angle of the steering-wheels H, that on the inside of the curve being turned more than that outside.
Figure 5:
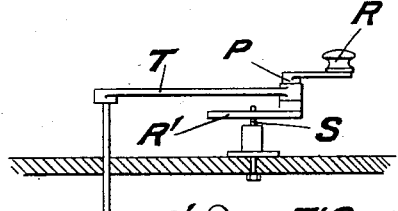
Figure 3:
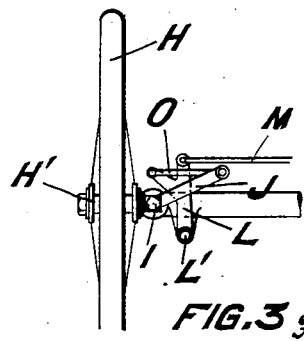
Fig. 3 shows one wheel H of a modified arrangement in which the sliding block K is dispensed with and a link O connects to a lever J, which replaces the pin J in Fig. 1.
Figure 4:
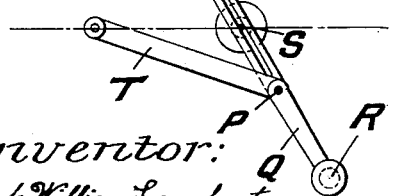

The above-described mechanism may be actuated by hand-wheel or tiller-bar in any suitable manner, but when a tiller-bar Q is employed (see Figs. 4 and 5) I prefer to arrange a joint P about one-third from the handle end R and provide a slotted extension-back R' from the jointed portion, the slot working on a fixed pin S. The link T connects to the link M of Fig. 1 by suitable way-shafts. The proportions of the parts are so arranged that a given movement of the handle R in a medial position has vastly less effect on the position of the steering-wheels than an equal movement when the handle is considerably over on either side. This is found to improve the steadiness without preventing rapid maneuvering.

Having now described my invention, what I claim as new, and desire to secure by Letters Patent, is—

1. In combination with the wheel, the pivoted journals, the levers L pivoted independently of the said journals to one side of the pivots thereof, and the connections between the said levers and their respective journals with means connecting the said levers to move simultaneously, substantially as described.

2. In combination in a steering-gear with the steering-wheels, the tiller-bar Q having a joint at P, the link T extending therefrom to connect with the steering means the said tiller having a slotted extension R' with a fixed pin engaging the same, substantially as described.

In witness whereof I have hereunto set my hand in presence of two witnesses.

FREDERICK WILLIAM LANCHESTER.

Witnesses:
ALBERT EDWARD PARKER,
FREDERICK COWLEY HARRIS.